United States Patent
Epstein et al.

(10) Patent No.: US 7,039,579 B2
(45) Date of Patent: May 2, 2006

(54) MONTE CARLO METHOD FOR NATURAL LANGUAGE UNDERSTANDING AND SPEECH RECOGNITION LANGUAGE MODELS

(75) Inventors: Mark E. Epstein, Katonah, NY (US); Jean-Christophe Marcadet, Noisy sur Ecole (FR); Kevin B. Smith, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 816 days.

(21) Appl. No.: 09/952,974

(22) Filed: Sep. 14, 2001

(65) Prior Publication Data

US 2003/0055623 A1    Mar. 20, 2003

(51) Int. Cl.
G06F 17/27    (2006.01)
G06F 17/20    (2006.01)

(52) U.S. Cl. ............................................. 704/9; 704/1
(58) Field of Classification Search .................... 704/9, 704/1
See application file for complete search history.

(56) References Cited

U.S. PATENT DOCUMENTS

| | | | | |
|---|---|---|---|---|
| 5,267,345 A | * | 11/1993 | Brown et al. ................ | 704/255 |
| 5,371,807 A | * | 12/1994 | Register et al. .............. | 382/159 |
| 5,469,355 A | * | 11/1995 | Tsuzuki ........................ | 704/9 |
| 5,634,084 A | * | 5/1997 | Malsheen et al. ........... | 704/260 |
| 5,873,660 A | * | 2/1999 | Walsh et al. .................. | 400/63 |
| 6,178,396 B1 | * | 1/2001 | Ushioda ......................... | 704/1 |
| 6,556,964 B1 | * | 4/2003 | Haug et al. .................... | 704/9 |
| 6,735,560 B1 | * | 5/2004 | Epstein .......................... | 704/9 |
| 2002/0116173 A1 | * | 8/2002 | Ratnaparkhi ................... | 704/9 |
| 2003/0046078 A1 | * | 3/2003 | Abrego et al. .............. | 704/260 |

OTHER PUBLICATIONS

Rohlicek, J. Chow, Y. Roucos, S. "Statistical Language Modeling Using a Small Corpus From an Application Domain", Acoustics, Speech and Signal Processing, vol. 1, pp. 267-270, Apr. 1988.*

Hajiri, K. "A Model on the Explanation Word Meanings Using Autonomously Emerging Boundary Computation", Systems, Man and Cybernetics, vol. 1, pp. 238-243, Oct. 1999.*

* cited by examiner

Primary Examiner—W. R. Young
Assistant Examiner—Matthew J. Sked
(74) Attorney, Agent, or Firm—Akerman Senterfitt

(57) ABSTRACT

A Monte Carlo method for use with natural language understanding and speech recognition language models can include a series of steps. The steps can include identifying at least one phrase embedded in a body of text wherein the phrase can belong to a phrase class. An additional attribute corresponding to the identified phrase can be determined. The body of text can be copied and the identified phrase can be replaced with a different phrase selected from a plurality of phrases. The different phrase can belong to the phrase class and correspond to the attribute.

25 Claims, 4 Drawing Sheets

MONTE CARLO METHOD FOR NATURAL LANGUAGE UNDERSTANDING AND SPEECH RECOGNITION LANGUAGE MODELS

BACKGROUND OF THE INVENTION

1. Technical Field

This invention relates to the field of speech recognition and natural language understanding, and more particularly, to an improved Monte Carlo method for generating training data.

2. Description of the Related Art

Computer-based systems capable of interacting with users in a conversational manner typically include a speech recognition (SR) system and a natural language understanding (NLU) system. The SR system can convert speech to text and the NLU system can extract information from the resulting text. Currently within the art, conversational systems can be implemented using statistical, rather than linguistic methods. Such statistical methods utilize high quality statistical models, such as a language model, for processing information. Notably, both SR and NLU systems can utilize statistical models for processing information. Oftentimes, both systems rely upon the same statistical model.

Language and understanding models can express restrictions imposed on the manner in which words can be combined to form sentences and can express the likelihood of a word appearing immediately adjacent or proximate to another word or words. Language models can be expressed as statistical models, grammatically based models, or lists of allowable phrases. Examples of statistical language models can include n-gram models such as the bigram and trigram models. Exemplary grammatical models can include context free grammars which can provide a formal specification of the structures allowable in a language. Context free grammars can be specified using Backus-Naur Form (BNF). Still, hybrid language models, such as the probabilistic context free grammar, can incorporate features of both grammatical and statistical models.

Presently, the development of both statistically based conversational systems and speech recognition language models require a large corpus of annotated sentences, called a training corpus. Artificial data creation methods can be used to increase the size of a training corpus in an effort to produce a higher quality language model. In particular, a Monte Carlo method can be used to generate additional training sentences from a set of actual training sentences. The Monte Carlo method entails making multiple copies of actual sentences and replacing phrases within the sentences with alternate phrases, thereby creating multiple permutations of the actual training sentence. For example, a training sentence including dates can be "I want to fly on May fifth". Using a Monte Carlo method, this sentence can be copied wherein the date phrase "May fifth" is replaced with another date phrase.

Conventional Monte Carlo methods, however, can have disadvantages. In particular, the substitution of a phrase having a syntax which differs from the replaced phrase can lead to grammatically incorrect training sentences. For example, substitution of the date expression "May fifth" with the alternate date expression "fifth of May" results in the grammatically incorrect training sentence "I want to fly on fifth of May". In addition to the phrase syntax, the text and characters surrounding the date phrase, referred to as the boundary conditions, also can affect which alternate phrase results in a well-formed sentence. In this case, the boundary condition of the actual well-formed training sentence lacked the article "the" before the date phrase. After insertion of the alternate phrase, the article "the" was needed to form a well-formed sentence. Boundary conditions can be particularly significant with regard to other languages wherein gender is enforced.

The inclusion of grammatically incorrect training sentences within a training corpus can result in a less accurate statistical model. Accordingly, the ability of a conversational program to extract meaning from text or a speech recognizer to decode an utterance can be diminished due to the inaccuracy of the statistical model relied upon by the NLU system. Because SR systems often rely upon the same flawed statistical model, the reduction in system performance can be even greater. This can lead to compound errors within a conversational computer-based system wherein speech is inaccurately converted to text and subsequently inaccurately interpreted.

SUMMARY OF THE INVENTION

The invention disclosed herein concerns an improved Monte Carlo method for generating training data for use with speech recognition and natural language understanding systems. The invention provides a method of generating additional grammatically correct, or well-formed, training sentences from actual training sentences which can be used to generate a language model. In particular, actual training sentences, which can be referred to as a body of text, can be copied wherein identified phrases within the training sentences can be replaced with alternate phrases based upon various phrase attributes. The phrase attributes can include, but are not limited to, phrase syntax, semantics, the border conditions surrounding the phrase within the training sentence, or specific non-terminals within a grammar that can parse the identified phrase. After replacement of the identified phrase with an alternate phrase, the resulting training sentence can be included within a training corpus in addition to the actual training sentence thereby increasing the amount of available training data. It should be appreciated that a larger amount of well-formed training sentences can result in a higher quality statistical model.

One aspect of the present invention can include a Monte Carlo method of developing a training corpus for use with natural language understanding or speech recognition language models. The method can include identifying at least one phrase embedded in a body of text wherein the phrase belongs to a phrase class. At least one attribute corresponding to the identified phrase can be determined. The phrase attribute can include or correspond to a phrase class, category, phrase semantics, syntax, boundary conditions, or a context of at least a portion of the body of text including the identified phrase. The body of text can be copied and the identified phrase can be replaced with a different phrase selected from a plurality of phrases. Notably, the plurality of phrases can be included within one or more data sources such as a grammar, selected non-terminals within a grammar, or a list. The different phrase can belong to the phrase class and have the attribute. Finally, the different phrase can have a probability value above a predetermined threshold value.

Another aspect of the invention can include a method of developing a training corpus for use with natural language understanding or speech recognition language models. The method can include identifying at least one phrase embedded within a body of text and locating a second phrase within a plurality of phrases. The second phrase can identically match the identified phrase. Further, the second phrase can belong to a phrase class and have at least one corresponding attribute. The attribute can include or correspond to a phrase class, category, phrase syntax, phrase semantics, boundary conditions, or a context of at least a portion of the body of text including the identified phrase. The body of text can be copied and the identified phrase can be replaced with a different phrase selected from the plurality of phrases. The different phrase can belong to the phrase class and have the attribute. Additionally, the different phrase can have a probability value above a predetermined threshold value.

BRIEF DESCRIPTION OF THE DRAWINGS

There are presently shown in the drawings embodiments which are presently preferred, it being understood, however, that the invention is not so limited to the precise arrangements and instrumentalities shown, wherein.

DETAILED DESCRIPTION OF THE INVENTION

The invention disclosed herein concerns an improved Monte Carlo method for generating training data for use with speech recognition and natural language understanding systems. In particular, the invention provides a method of generating additional grammatically correct, or well-formed, training sentences from actual training sentences which can be part of a training corpus. Specifically, phrases within an actual training sentence can be identified and classified according to various phrase attributes including, but not limited to, phrase syntax, phrase subject matter, and the border conditions surrounding the phrase within the actual training sentence. Using the identified phrase attributes, one or more alternate phrases can be selected from a data source containing a plurality of alternate phrases. The actual training sentences can be copied and the selected alternate phrases can be substituted for the original identified phrases within the actual training sentences thereby creating artificial training sentences. The artificial training sentences can be included within the training corpus in addition to the actual training sentences so that higher quality statistical models can be constructed from the larger training corpus.

Figure 1:
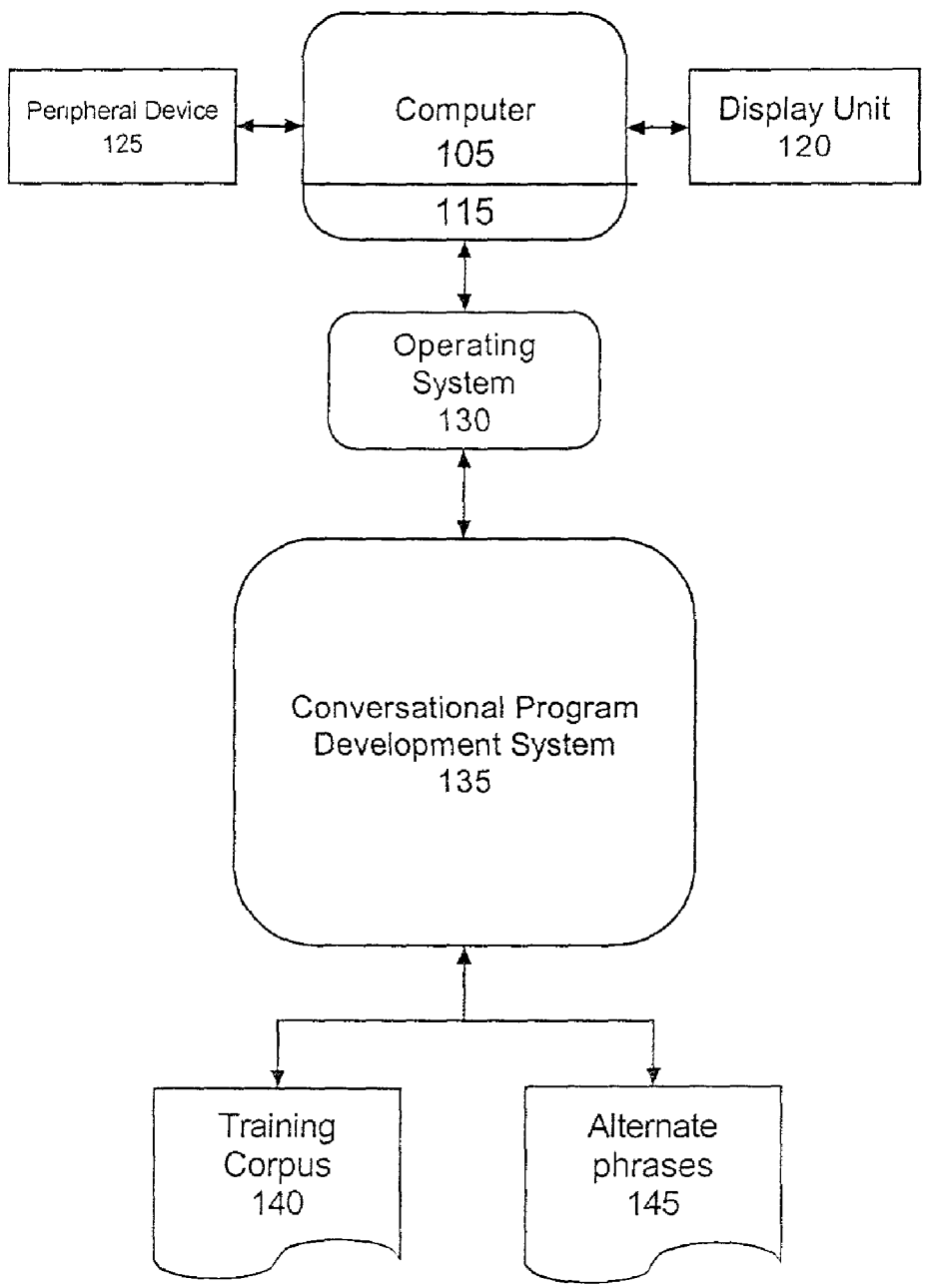
FIG. 1 is a schematic diagram of an exemplary computer system and architecture on which the invention can be used.

FIG. 1 depicts a typical computer system 100 and accompanying computer architecture for use in conjunction with the present invention. The system can include a computer 105 including a central processing unit (CPU), one or more memory devices 115, and associated circuitry. The CPU can be comprised of any suitable microprocessor or other electronic processing unit, as is well known to those skilled in the art. The memory devices 115 can be comprised of an electronic random access memory and a bulk data storage medium. The system also can include a variety of peripheral devices 125 such as a microphone, a mouse, and a keyboard, each operatively connected to the computer 105 through suitable interface circuitry. A user interface display unit 120 such as a video data terminal can be operatively connected to the computer system 100 through suitable interface circuitry as well. Speakers also can be provided with the system. The various hardware requirements for the computer system as described herein can generally be satisfied by any one of many commercially available high speed computers.

The exemplary computer architecture shown in FIG. 1 can be used for developing a conversational or dialog based system. As shown in FIG. 1, within the memory 115 of computer system 100 can be an operating system 130, conversational program development system (development system) 135, and a training corpus 140. A data source of alternate phrases 145 also can be provided. The development system 135 can include a speech recognition system and a natural language understanding system. Specifically, the development system 135 can include a speech recognition engine for converting user spoken utterances to text and an NLU engine for analyzing text and determining linguistic meaning from text. A dialog manager can be included to handle tasks requested by a user, and one or more NLU utilities and application templates can be available for developing conversational or dialog based programs. It should be appreciated that such systems are known in the art are commercially available from manufacturers such as International Business Machines Corporation.

The training corpus 140, as is well known in the art, can include text representing user spoken utterances. The text can be grammatically correct and further can include sentences, or bodies of text, and text reflecting common usage of language which can include grammatically incorrect but generally accepted usages. The training corpus can be derived from any of a variety of sources including a script, transcribed user responses, or transcribed spontaneous user spoken utterances. The data source of alternate phrases 145 can include a variety of alternate text phrases and strings corresponding to identifiable phrase classes and categories.

In FIG. 1, the development system 135 is shown as a single computer program. It should be noted however that the invention is not limited in this regard, and the computer program can be implemented as one or more independent computer programs. The aforementioned components can be realized in a centralized fashion within the computer system 100. Alternatively, the aforementioned components can be realized in a distributed fashion where different elements are spread across several interconnected computer systems. In any case, the components can be realized in hardware, software, or a combination of hardware and software. Any kind of computer system, or other apparatus adapted for carrying out the methods described herein is suited. The system as disclosed herein can be implemented by a programmer, using commercially available development tools for the particular operating system used.

Computer program in the present context means any expression, in any language, code or notation, of a set of instructions intended to cause a system having an information processing capability to perform a particular function either directly or after either or both of the following: a) conversion to another language, code, or notation; b) reproduction in a different material form.

Figure 2:
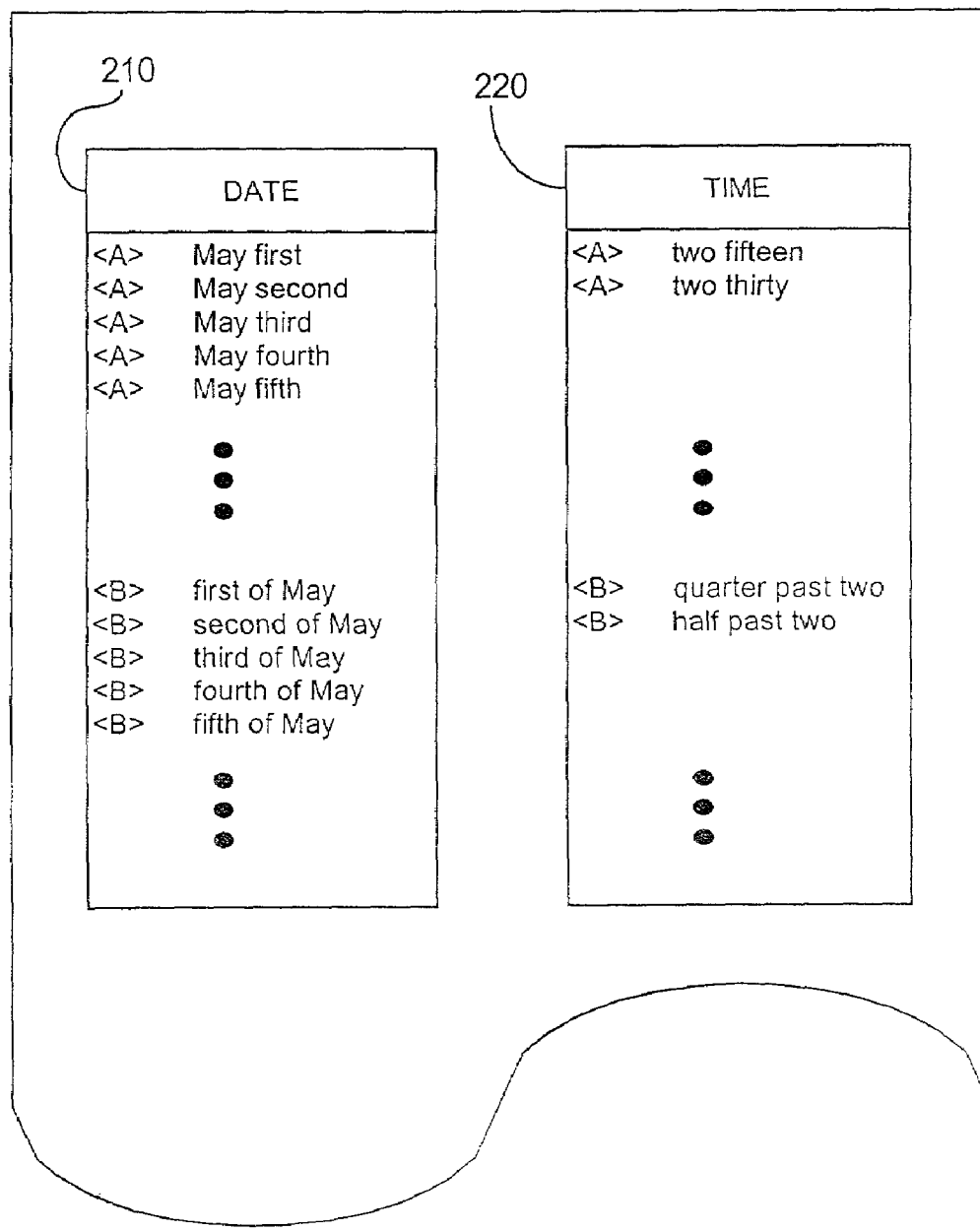
FIG. 2 is a pictorial representation of an exemplary data source having alternate phrases for use with the present invention.

FIG. 2 is a pictorial representation of the exemplary data source of alternate phrases 145 of FIG. 1. The data source of allowable phrases can be subdivided into various classes of phrases. Notably, nearly any definable phrase grouping can be a phrase class with common examples including dates, times, and prices. For example, phrase classes can be based upon syntax, semantics, or border conditions. As shown in FIG. 2, the data source can include a date class 210 and a time class 220. Defined phrase classes further can be subdivided into various categories of phrase classes. This categorization can be based upon the syntax or semantics of each phrase as well as the boundary conditions. For example, the date class 220 has been subdivided into two categories of dates A and B. Category A date expressions can include any date expression having a syntax of <MONTH> <ORDINAL>. Category B date expressions can include any date expression having a syntax of <ORDINAL> of <MONTH>. Additional categories of dates for representing different syntaxes also can be included within the date class as needed. For example, a classification can be based upon the tense of a phrase such as past, present, or future. Still, another classification can be the function of the phrase within a training sentence. For example, the phrase can be identified as a noun or verb phrase or a subject or object within a larger grammatical phrase. Regardless, the classes and categories of alternate words can be further subdivided as needed according to a particular attribute. It should be appreciated by those skilled in the art that the invention can be used with other phrases and is not limited to dates. Moreover, the phrase classes can be determined using any of the aforementioned techniques.

Notably, the categories within a class can be used to determine which expressions within the class of alternate phrases can replace a particular identified phrase and result in a well formed sentence. For example, category A dates can replace date expressions which are not preceded by the article "the". Category B dates, however, require the article "the" to be a well formed sentence. In illustration, replacing the category A phrase "May fifth" within the exemplary training sentence "I want to fly on May fifth" with the category B phrase "fifth of May" produces a grammatically incorrect training sentence. In particular, the resulting training sentence "I want to fly on fifth of May" lacks the article "the". Accordingly, a particular phrase identified as a category A or as having a syntax corresponding to the alternate phrases within category A can be replaced with only alternate phrases corresponding to class A. It should be appreciated, however, that more than one category can be a suitable replacement for an identified phrase. For example, a category A phrase can be replaced with other category A phrases as well as category E and F phrases if those categories correspond or are syntactically similar to category A.

The boundary conditions described above can include any "n-gram" immediately preceding and/or following the phrase to be replaced. Other punctuation marks such as commas, periods, colons, semi-colons, and the like also can be included within the boundary conditions. For example, an identified phrase preceded by the word "the" may only be replaced with an alternative phrase which also must be preceded with the word "the". Alternative phrases which do not have the same boundary condition as the identified word can be restricted from use as a replacements. Notably, boundary conditions can be particularly useful with regard to determining alternate phrases when developing training data for languages that enforce gender agreement.

It should be appreciated that the alternate phrases 145 can be included within a single data structure, or alternatively, within a plurality of data structures. The alternate phrases 145 can be classified and categorized according to syntax, semantics, boundary conditions, or any combination thereof. The alternate phrases 145 can be defined within statistical models, grammatically based models, or as lists of allowable phrases. Exemplary grammatical models can include context free grammars which can provide a formal specification of the structures allowable in a language using Backus-Naur Form (BNF). Hybrid language models, such as a probabilistic context free grammar, can incorporate features of both grammatical and statistical models. Still, as mentioned, allowable phrases can be specified as one or more lists.

For example, the alternate phrases 145 can be included within a single data structure such as a grammar, wherein specific non-terminals can be marked according to class, category, or any of the aforementioned attributes. While terminals refer to words or other symbols which cannot be subdivided any further, non-terminals refer to parts of speech or phrases such as a verb phrase or a noun phrase which can be further subdivided. Still, the alternate phrases 145 can be broken down into a plurality of smaller data structures wherein each data structure can correspond to a class, category, or an attribute. The data structures can contain rules or markers denoting which phrase attributes, categories, or classes must be respected. Regardless of the data structure used to specify alternate phrases, the alternate phrases can be assigned relative weights or relative probability values based upon an analysis of an exemplary training corpus.

An exemplary BNF fragment of a date grammar is illustrated in the Appendix. In one embodiment of the invention, a user or developer can specify whether each non-terminal within the grammar is an attribute that must be respected. For example, if <date> is marked as an attribute to be respected, then <mmddyy> formatted phrases would only be replaced by <mmddyy> formatted alternates. Similarly, <ordmmyy> formatted phrases would only be replaced by <ordmmyy> formatted alternates. If no non-terminal is specified, then any of the alternatives for a particular phrase can be alternates. In that case, for example, a date phrase can be replaced with alternates having <mmddyy>, <ordmmyy>, or <mmordyy> formats.

Figure 3:
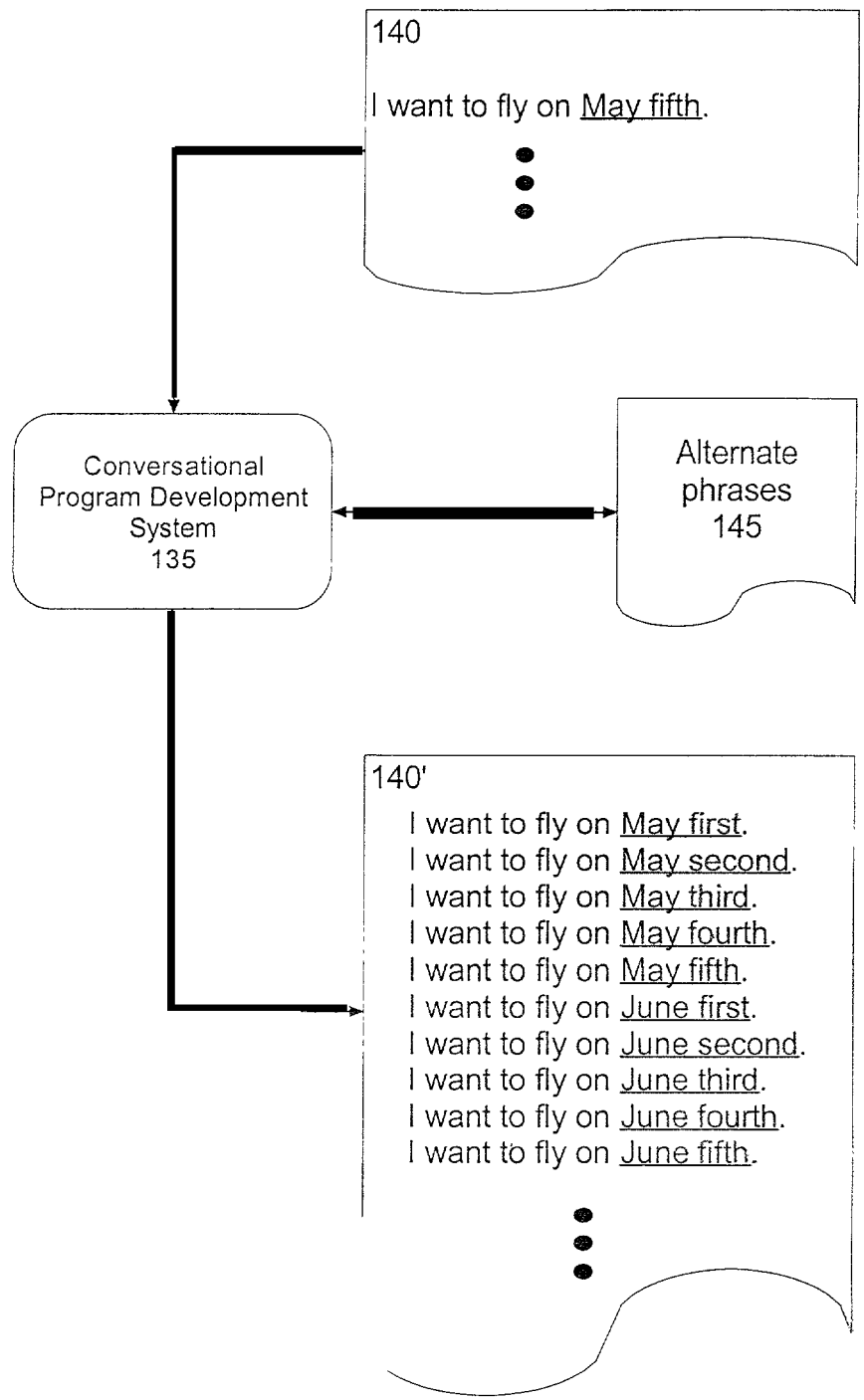
FIG. 3 is a pictorial diagram illustrating aspects of the invention disclosed herein.

FIG. 3 is a pictorial diagram illustrating aspects of the invention disclosed herein. As shown in FIG. 3, the development system 135 has identified the date phrase "May fifth" which has been underlined within a sentence of the training corpus 140 for purposes of illustration. One or more alternate phrases can be selected from the data source of alternate phrases 145. As mentioned, the selected alternate phrases can correspond to the identified phrase by class, category, syntax, semantics, or boundary condition.

Having identified the phrase "May fifth" in the training corpus sentence, the conversational program development system 135 can determine alternate phrases in any of a variety of ways. In one embodiment, the identified phrase can be located within the alternate phrases 145. Once the identified phrase "May fifth" is located, the conversational development system 135 can read the attributes of that phrase and search for alternative phrases having like or identical attributes. In another embodiment, the conversational program development system 135 can determine the attributes corresponding to the identified phrase "May fifth" and search for alternative phrases having like or identical phrase attributes within the group of alternate phrases 145.

Using the selected alternate phrases, the development system 135 can generate additional training sentences by copying the actual training sentence and replacing the identified phrase with one of the selected alternate phrases. Thus, the date phrase "May fifth" has been identified and replaced with each of the following phrases: "May first", "May second", "May third", "May fourth", "June first", "June second", "June third", "June fourth", and "June fifth". In this case, the alternative phrases have attributes such as syntax and boundary conditions which correspond to the identified phrase "May fifth". A sentence including each of the aforementioned phrases can be included within a reformed training corpus 140' as shown in FIG. 2. Notably, the actual training corpus sentence also can be included within the reformed training corpus 140'.

Figure 4:
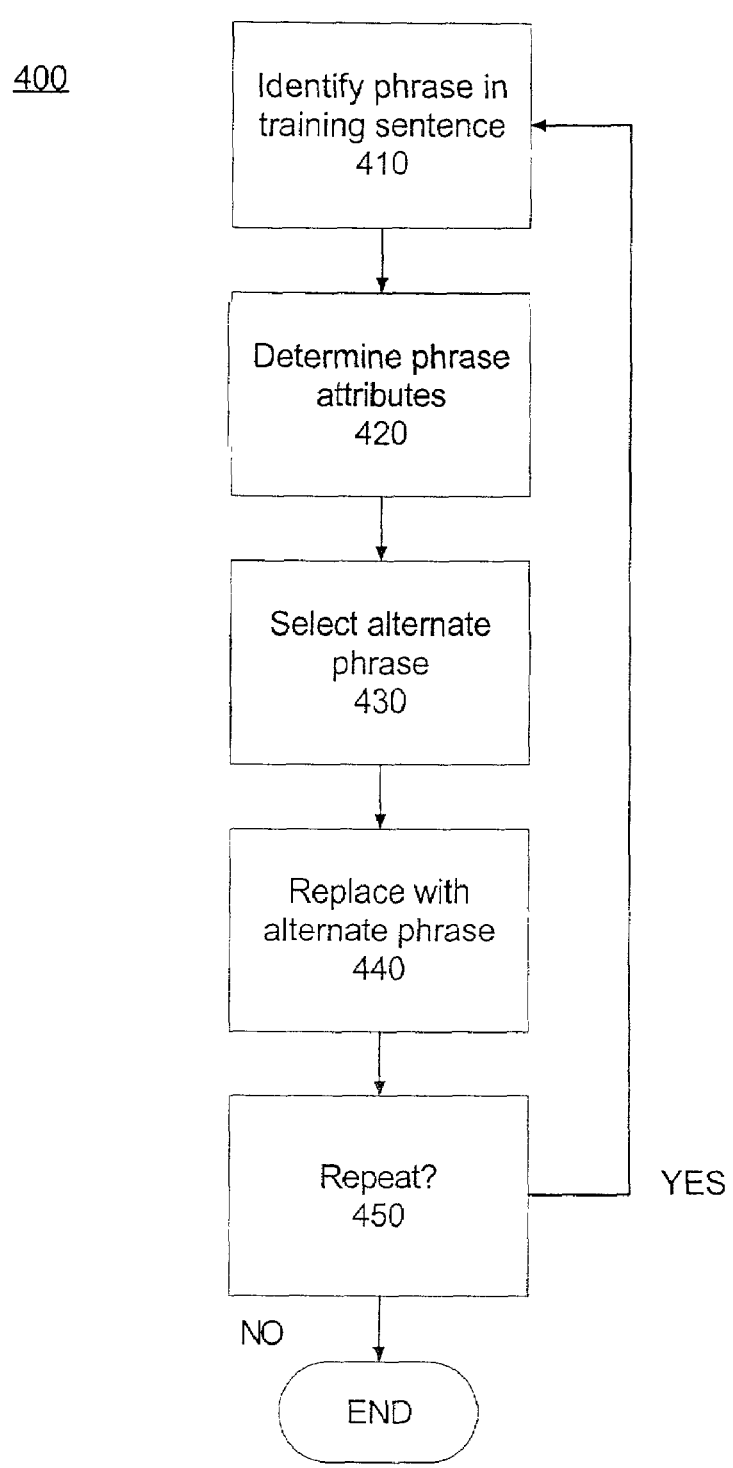
FIG. 4 is a flow chart illustrating an exemplary method of the invention.

FIG. 4 is a flow chart illustrating an exemplary method of the invention. In step 410, a phrase can be identified within a training sentence. For example, a developer can select a particular phrase for replacement. Alternatively, the developer can provide the development system with phrase attributes specifying a particular class, boundary condition, or category for automatically selecting a phrase. In that case, the first phrase within the training corpus corresponding to the selected criteria can be selected or a phrase following the first phrase can be selected. For example, the identified phrase can be the proper name of an airline such as "Delta Airlines."

In step 420, phrase attributes which can include phrase syntax, semantics, class, category, boundary conditions, or any combination thereof can be determined. If the developer has selected the phrase, the information can be determined manually or by the development system. If the developer has specified criteria, the attributes need not be determined. Rather, the developer can verify that the development system has correctly identified a phrase corresponding to the selected phrase attributes.

In step 430, an alternate phrase corresponding to the selected phrase attributes can be determined. As mentioned, an alternate phrase having similar or identical phrase attributes as the identified phrase can be selected. Accordingly, an alternate phrase having a syntax corresponding to the identified phrase and which provides a grammatically correct replacement for the identified phrase based upon the boundary conditions also can be determined. The phrase can be selected by consulting a data structure having only phrases of like class and category, or by consulting a data structure including alternate phrases of different classes or categories. In that case, phrase attributes can be specified using data identifiers or rules within the data structure which can be used to distinguish alternates between classes, categories, or boundary conditions. If the data structure of alternate phrases includes probability information, an alternate phrase can be selected according to the probability distribution.

In another embodiment of the invention, an alternate phrase which identically can match the identified phrase can be selected within the data source of alternate phrases. In that case, the phrase attributes corresponding to the identically matching phrase can be determined. Notably, because the matching phrase is identical to the identified phrase, the phrase attributes corresponding to the two phrases also are identical. Upon locating the match and determining the phrase attributes, other alternate phrases can be identified which have corresponding phrase attributes.

For example, if "Delta Airlines" was the identified phrase, one possible categorization of alternate airline names can be the country in which the airline is based. Accordingly, if the identified airline is based out of the United States of America, then in one embodiment, only alternate airline names which are also based in the U.S.A. can be used as a replacement. Other categories of airlines can correspond to specific countries or regions of the world. Still, another category of airline can be charter or non-charter. Notably, such geographic information can be included within the alternate phrases as markers or as rules. As mentioned, in another embodiment of the invention, a single data structure restricted to including only airlines based in the U.S.A. can be provided. It should be appreciated that defined classes and categories can be designated by the system designer. Accordingly, the invention is not limited to the specific embodiments and examples disclosed herein.

In step 440, the actual training sentence can be copied and the identified phrase within the copied sentence can be replaced with the selected alternate phrase. The resulting training sentence can be included within the training corpus in addition to the actual training sentence. In step 450, the method of the invention can repeat if additional phrases are to be replaced with alternate phrases for creating additional training data. If not, then the method can end.

This invention can be embodied in other specific forms without departing from the spirit or essential attributes thereof, and accordingly, reference should be made to the following claims, rather than to the foregoing specification, as indicating the scope of the invention.

APPENDIX

| | |
|---|---|
| <date> = | <mmddyy> \| <ordmmyy> \| <mmordyy> \| . . . |
| <mmddyy> = | <month> <daynum> <yearnum>. |
| <ordmmyy> = | <ordnum> of <month> <yearnum>. |
| <yearnum> = | <yearnum4digits> \| <yearnum2digits>. |
| <month> = | <1–12> \| <monthname>. |
| <1–12> = | one \| two \| three \| four \| five \| six \| seven \| eight \| nine \|ten \| eleven \| twelve. |
| <monthname> = | January \| February \| March \| April \| May \| June \| July \| August \| September \| October \| November \| December. |

What is claimed is:

1. A Monte Carlo method of developing a training corpus for use with natural language understanding or speech recognition language models, said method comprising:
   identifying at least one phrase embedded in a body of text, said phrase belonging to a phrase class;
   determining at least one subject matter attribute corresponding to said identified phrase; and
   augmenting the training corpus by copying said body of text and replacing said identified phrase with a different phrase selected from a plurality of phrases, said different phrase belonging to said phrase class and having said determined subject matter attribute.

2. The method of claim 1, wherein said plurality of phrases are included within a single data source selected from the group consisting of a grammar, selected non-terminal within a grammar, and a list.

3. The method of claim 1, wherein said plurality of phrases are included within at least two data sources wherein at least one of said data sources is selected from the group consisting of a grammar, selected non-terminals within a grammar, and a list.

4. The method of claim 1, wherein said subject matter attribute is selected from the group comprising at least one phrase category and at least one boundary condition.

5. The method of claim 1, wherein said subject matter attribute corresponds to at least one of a date attribute, a time attribute, a geographical attribute, and a name attribute.

6. The method of claim 1, wherein said different phrase has a probability value which exceeds a predetermined threshold value.

7. A Monte Carlo method of developing a training corpus for use with natural language understanding or speech recognition language models, said method comprising;
   identifying at least one phrase embedded within a body of text;

locating a second phrase within a plurality of phrases, said second phrase identically matching said identified phrase, wherein said second phrase belongs to a phrase class and has at least one subject matter attribute corresponding to said phrase class; and copying said body of text and replacing said identified phrase with a different phrase selected from said plurality of phrases, said different phrase having a subject matter attribute that matches the subject matter attribute of said second phrase.

8. The method of claim 7, wherein said plurality of phrases are included within a single data source selected from the group consisting of a grammar, selected non-terminals within a grammar, and a list.

9. The method of claim 7, wherein said plurality of phrases are included within at least two data sources selected from the group consisting of a grammar, selected non-terminals within a grammar, and a list.

10. The method of claim 7, wherein said subject matter attribute is selected from the group comprising at least one phrase category and at least one boundary condition.

11. The method of claim 7, wherein said subject matter attribute corresponds to at least one of a date attribute, a time attribute, a geographical attribute, and a name attribute.

12. The method of claim 7, wherein said different phrase has a probability value which exceeds a predetermined threshold value.

13. A machine readable storage, having stored thereon a computer program having a plurality of code sections executable by a machine for causing the machine to perform the steps of:

identifying at least one phrase embedded in a body of text, said phrase belonging to a phrase class;

determining at least one subject matter attribute corresponding to said identified phrase; and augmenting the training corpus by copying said body of text and replacing said identified phrase with a different phrase selected from a plurality of phrases, said different phrase belonging to said phrase class and having said determined subject matter attribute.

14. The machine-readable storage of claim 13, wherein said plurality of phrases are included within a single data source selected from the group consisting of a grammar, selected non-terminals within a grammar, and a list.

15. The machine-readable storage of claim 13, wherein said plurality of phrases are included within at least two data sources wherein at least one of said data sources is selected from the group consisting of a grammar, selected non-terminal within a grammar, and a list.

16. The machine-readable storage of claim 13, wherein said subject matter attribute is selected from the group comprising at least one phrase category and at least one boundary condition.

17. The machine-readable storage of claim 13, wherein said subject matter attribute corresponds to at least one of a date attribute, a time attribute, a geographical attribute, and a name attribute.

18. The machine-readable storage of claim 13, wherein said different phrase has a probability value which exceeds a predetermined threshold value.

19. A machine readable storage, having stored thereon a computer program having a plurality of code sections executable by a machine for causing the machine to perform the steps of:

identifying at least one phrase embedded within a body of text;

locating a second phrase within a plurality of phrases, said second phrase identically matching said identified phrase, wherein said second phrase belongs to a phrase class and has at least one subject matter attribute corresponding to said phrase class; and copying said body of text and replacing said identified phrase with a different phrase selected from said plurality of phrases, said different phrase having a subject mattet attribute that matches the subject matter attribute of said second phrase.

20. The machine-readable storage of claim 19, wherein said plurality of phrases are included within a single data source selected from the group consisting of a grammar, selected non-terminals within a grammar, and a list.

21. The machine-readable storage of claim 19, wherein said plurality of phrases are included within at least two data sources selected from the group consisting of a grammar, selected non-terminals within a grammar, and a list.

22. The machine-readable storage of claim 19, wherein said subject matter attribute is selected from the group comprising at least one phrase category and at least one boundary condition.

23. The machine-readable storage of claim 19, wherein said subject matter attribute corresponds to at least one of a date attribute, a time attribute, a geographical attribute, and a name attribute.

24. The machine-readable storage of claim 19, wherein said different phrase has a probability value which exceeds a predetermined threshold value.

25. A Monte Carlo method of developing a training corpus for use with natural language understanding or speech recognition language models, said method comprising:

identifying at least one phrase embedded in a body of text, said phrase belonging to a phrase class;

determining at least one syntax-independent and semantics-independent subject matter attribute corresponding to said identified phrase; and augmenting the training corpus by copying said body of text and replacing said identified phrase with a different phrase selected from a plurality of phrases, said different phrase belonging to said phrase class and having said determined subject matter attribute.

* * * * *